(12) United States Patent
Losey

(10) Patent No.: US 7,017,635 B2
(45) Date of Patent: Mar. 28, 2006

(54) TIRE WITH OUTSIDE-IN PLY CONSTRUCTION

(75) Inventor: Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 155 days.

(21) Appl. No.: 10/330,890

(22) Filed: Dec. 27, 2002

(65) Prior Publication Data

US 2004/0123928 A1 Jul. 1, 2004

(51) Int. Cl.
*B60C 15/00* (2006.01)
*B60C 15/06* (2006.01)

(52) U.S. Cl. ............... 152/539; 152/542; 152/546; 152/550; 152/553

(58) Field of Classification Search ............... 152/539, 152/540, 548, 550, 552, 553, 554, 542; 245/1.5
See application file for complete search history.

(56) References Cited

U.S. PATENT DOCUMENTS

| | | | |
|---|---|---|---|
| 3,062,258 A | 11/1962 | Maiocchi | |
| 3,431,963 A | 3/1969 | Sons, Jr. | |
| 3,451,461 A | 6/1969 | Wittneben | |
| 3,481,386 A | 12/1969 | Menell et al. | |
| 3,540,511 A | 11/1970 | Mirtain | |
| 3,730,246 A | 5/1973 | Sidles et al. | |
| 4,150,703 A | 4/1979 | Sons, Jr. | |
| 4,580,610 A | 4/1986 | Jackson | |
| 4,917,166 A * | 4/1990 | Iuchi | 152/554 |
| 5,513,686 A | 5/1996 | Diernaz | |
| 5,679,188 A | 10/1997 | Robinson et al. | |
| 5,688,345 A | 11/1997 | Billieres | |
| 6,345,657 B1 * | 2/2002 | Kato | 152/540 |
| 6,352,090 B1 | 3/2002 | Rayman | |
| 6,491,076 B1 | 12/2002 | Colantonio et al. | |

FOREIGN PATENT DOCUMENTS

| | | | |
|---|---|---|---|
| DE | 4310714 | * | 10/1994 |
| EP | 1024033 | | 8/2000 |
| FR | 1425801 | | 12/1965 |
| GB | 1322281 | * | 7/1973 |
| JP | 2-155812 | * | 6/1990 |
| JP | 09300922 | | 11/1997 |
| JP | 10-24711 | * | 1/1998 |
| JP | 10-157408 | * | 6/1998 |
| JP | 10157408 | | 6/1998 |
| WO | WO 98/52777 | | 11/1998 |

* cited by examiner

*Primary Examiner*—Jeff H. Aftergut
*Assistant Examiner*—Justin Fischer
(74) *Attorney, Agent, or Firm*—Thompson Hine LLP

(57) ABSTRACT

A pneumatic tire for trucks having reduced weight and less material usage. The present invention utilizes an outside-in radial ply construction, which aids to torque the tire bead into the rim of the wheel to which it is mounted and allows the rim to provide greater support for the tire. The size of the bead may be reduced, permitting a reduction in the amount of rubber and reinforcement around and above the bead.

24 Claims, 6 Drawing Sheets

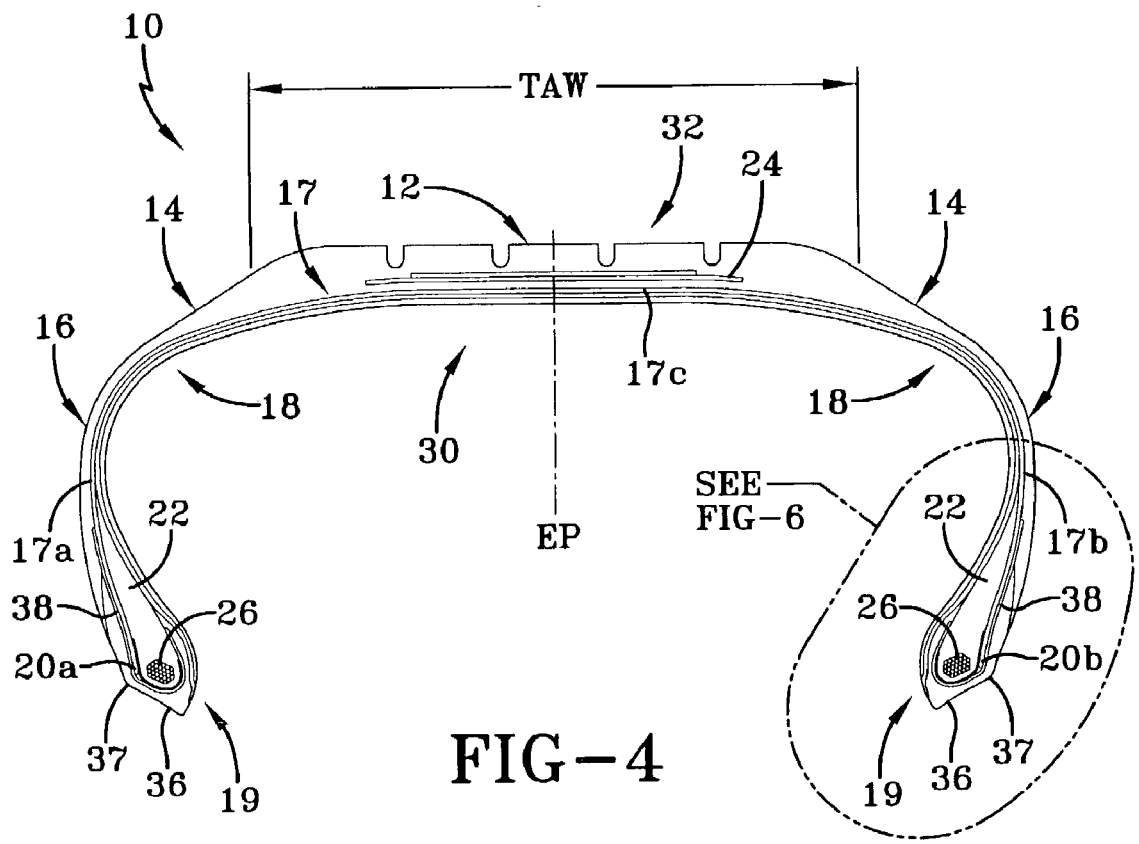
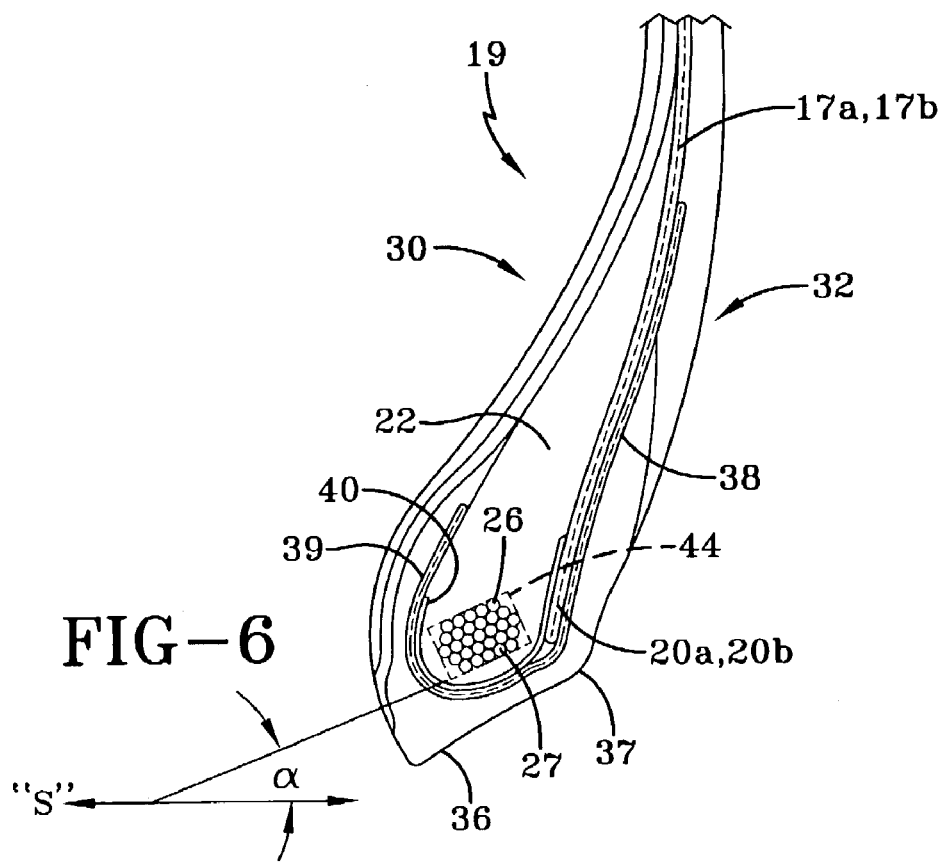

TIRE WITH OUTSIDE-IN PLY CONSTRUCTION

FIELD

This invention relates to pneumatic tires. In particular, the invention relates to a ply construction for truck tires and bus tires, which are collectively referred to herein as "truck tires."

BACKGROUND OF THE INVENTION

Motor vehicle tires are designed to satisfy a number of performance criteria, such as durability, low rolling resistance, low tendency for hydroplaning, high wet traction, good handling characteristics and low noise. These criteria are particularly important for truck tires, which are frequently operated at highway speeds for long periods of time and over many miles under varying environmental conditions.

In addition to satisfying performance criteria it is desirable to design a truck tire that is lightweight. There are several motivations for reducing tire weight. For example, a lighter tire improves fuel economy by lowering the total vehicle weight, which in turn lowers the amount of loading on the truck's engine. Lighter tires also run cooler, which lessens heat build-up damage to rubber compounds that can reduce the service life of the tire. Unfortunately, designing a tire that satisfies the necessary performance criteria for truck service often requires trade-offs that result in a heavier tire than desired.

A further design goal is to minimize the amount of materials used to construct a tire, in order to reduce costs. Even a small decrease in the amount of materials needed to produce a tire can result in significantly decreased material expenses for a manufacturer engaged in high-volume tire production. There is a need for a truck tire having reduced weight that provides the desired performance characteristics and can be produced with fewer materials.

SUMMARY

The present invention provides a tire utilizing an outside-in ply construction which torques the tire bead into the rim of the wheel to which it is mounted. The tire's outside-in ply construction also serves to pull down the toe of the tire, improving contact between the tire and the rim and to reduce rim indentation. The outside-in ply construction allows the rim to provide greater support for the tire. The increased rim support reduces toe lifting and facilitates the use of a smaller bead as compared to conventional truck tires. A smaller bead, combined with a smaller amount of rubber and reinforcement around and above the bead, reduces the tire's weight and material usage.

The invention, together with other objects and advantages thereof, will best be understood with reference to the following description of preferred embodiments taken in conjunction with the accompanying drawings.

DEFINITIONS

"Axial" and "axially" means the lines or directions that are parallel to the axis of rotation of the tire.

"Carcass" means the tire structure apart from the belt structure, tread, undertread, and sidewall rubber over the plies, but including the bead cores.

"Equatorial Plane" ("EP") means the plane perpendicular to the tire's axis of rotation and passing through the center of its tread.

"Hydroplaning" refers to a condition wherein a tire in motion loses traction during wet pavement conditions because the tire is not in contact with the surface. The tire is in contact only with a film of liquid on the surface.

"Interior" means the generally inside surface of the tire.

"Exterior" means the generally outside surface of the tire.

"Pneumatic tire" means a laminated mechanical device of generally toroidal shape (usually an open-torus) having bead cores and a tread and made of rubber, chemicals, fabric and steel or other materials. When mounted on the wheel of a motor vehicle, the tire through its tread provides traction and contains the fluid that sustains the vehicle load.

"Radial" and "radially" mean directions toward or away from the axis of rotation of the tire.

"Sidewall" means that component which comprises a portion of the outside surface of a tire between the tread and the bead.

"Tire industry standard size" refers to the series of letters and numbers used by tire manufacturers to define a tire's characteristics. The series includes such factors as tire width, aspect ratio (height to width), radial/bias type, rim diameter, speed rating, and load rating.

"Tread" means a molded rubber component which when, bonded to a tire casing, includes that portion of the tire that comes into contact with the road when the tire is normally inflated and under normal load.

"Tread Width or Tread Arc Width" means the arc length of the road-contacting tread surface in the axial direction, that is, in a plane parallel to the axis of rotation of the tire.

BRIEF DESCRIPTION OF DRAWING

In the accompanying drawings:

FIG. 4 is a cross-sectional view of the general construction of a tire according to one embodiment of the present invention;

FIG. 6 shows an expanded cross-sectional view of the bead region of the tire of FIG. 5;

DESCRIPTION OF THE PREFERRED EMBODIMENT(S)

Figure 1:
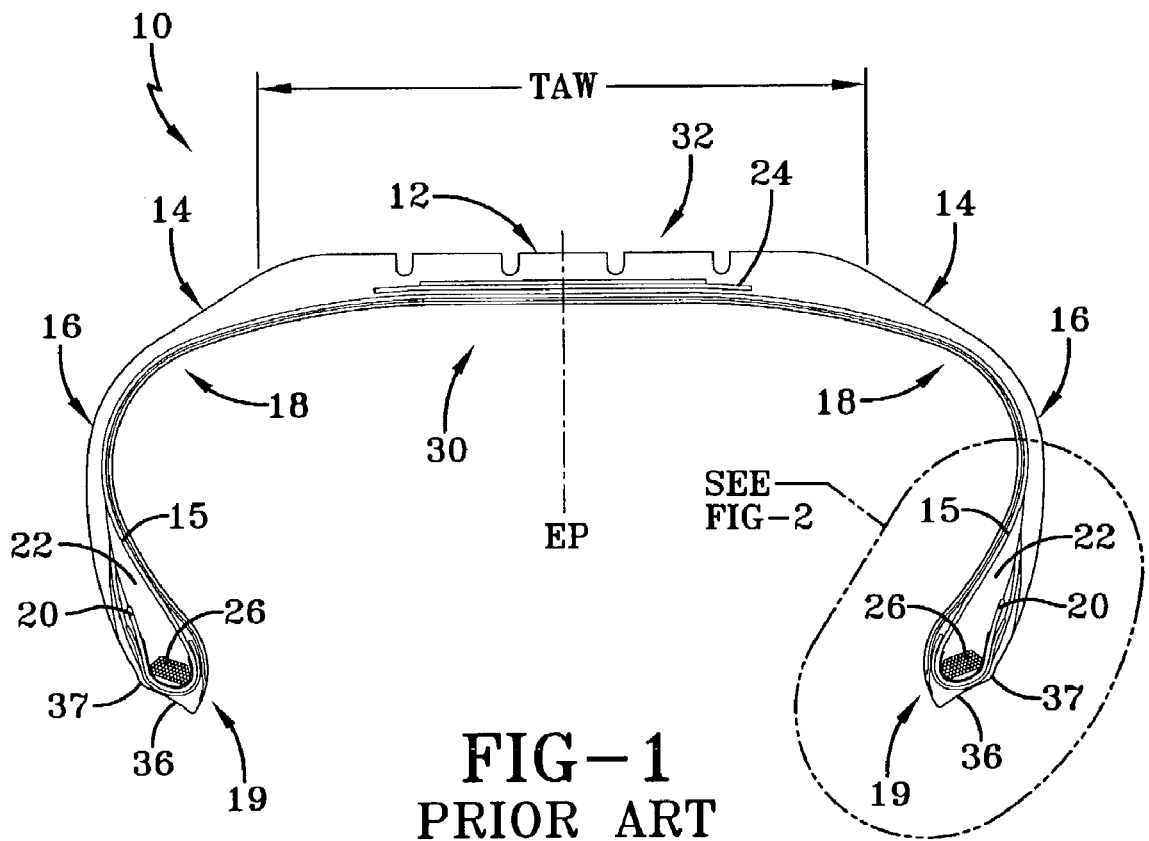
FIG. 1 is a cross-sectional view of the general construction of a prior art tire.

In the drawings the same numbers are used for the same components or items in the several views. With particular reference to FIG. 1, there is illustrated a cross-sectional view of the general construction of a prior art tire 10. The tire has a tread portion 12 and a pair of sidewalls 16 wherein the sidewalls are connected to the tread portion by shoulder regions 14. The tire may have one or more reinforcing belts 24. A carcass 18 of the tire includes one or more continuous radial plies 15, such as steel radial plies, extending from side to side. Bead regions 19 of the tire have a pair of axially spaced bead cores 26 around which are wrapped turn-up ends 20 of the radial plies 15. An apex 22 is sandwiched between the main body of the carcass 18 and the turn-up ends 20. Toes 36 and heels 37 provide a base for fitting the tire 10 to a wheel rim (not shown). FIG. 1 also illustrates the equatorial plane ("EP") and the tread arc width ("TAW") of the tire 10.

Figure 2:
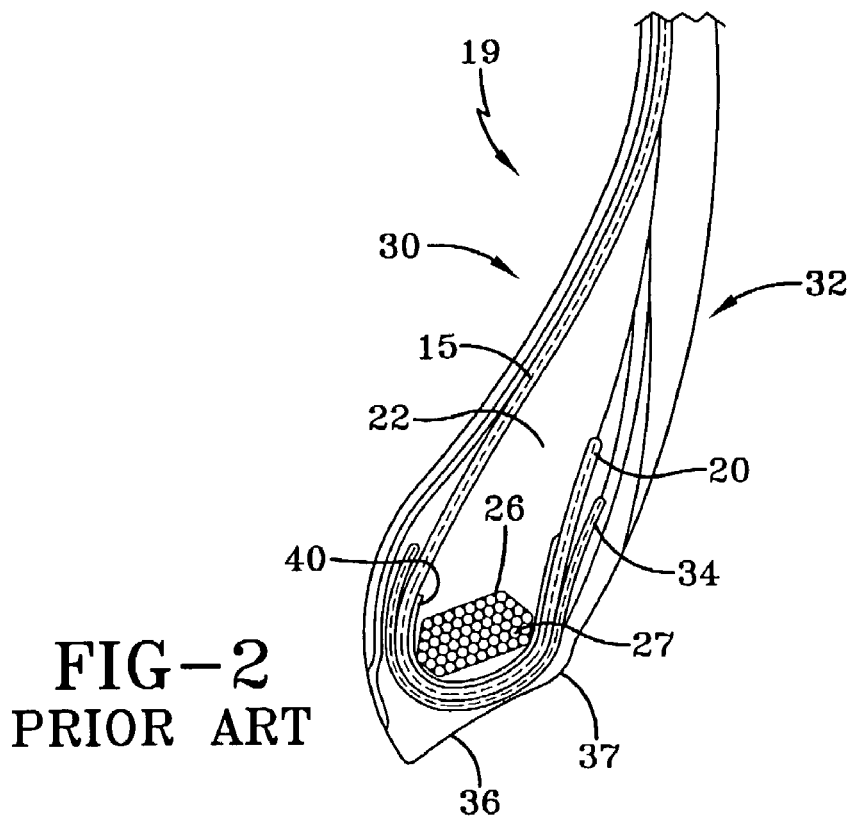
FIG. 2 illustrates an expanded cross-sectional view of the bead region of the tire of FIG. 1.

FIG. 2 illustrates an expanded cross-sectional view of the bead region 19 of a prior art tire. Each of the bead cores 26 have a substantially inextensible coil of round metal filaments 27. The wire gauge of the filaments may range from 0.050 to 0.080 inches. Typical sizes are 0.080, 0.072, 0.063 and 0.050 inch diameter. The bead may be made by winding a single filament into an annular configuration or by using multiple individual filaments. The number of winds or filaments may vary, depending upon the size of the tire. A small truck tire may have as few as 20 filaments or winds, while larger truck tires may utilize as many as 65 winds or filaments. A flipper 40, such as a nylon fabric ply, is wrapped around the bead 26 to prevent the filaments 27 from cutting through the surrounding plies and rubber. The flipper 40 is surrounded by a turn-up end 20 of a radial ply 15. The radial ply 15 is routed generally parallel to the interior 30 of the tire, wraps around the bead 26, and terminates with a turn-up end 20 generally parallel to the exterior 32 of the tire. A chipper 34 may be wrapped around a portion of the turn-up end 20 to act as a stiffness transition gradient.

Figure 3:
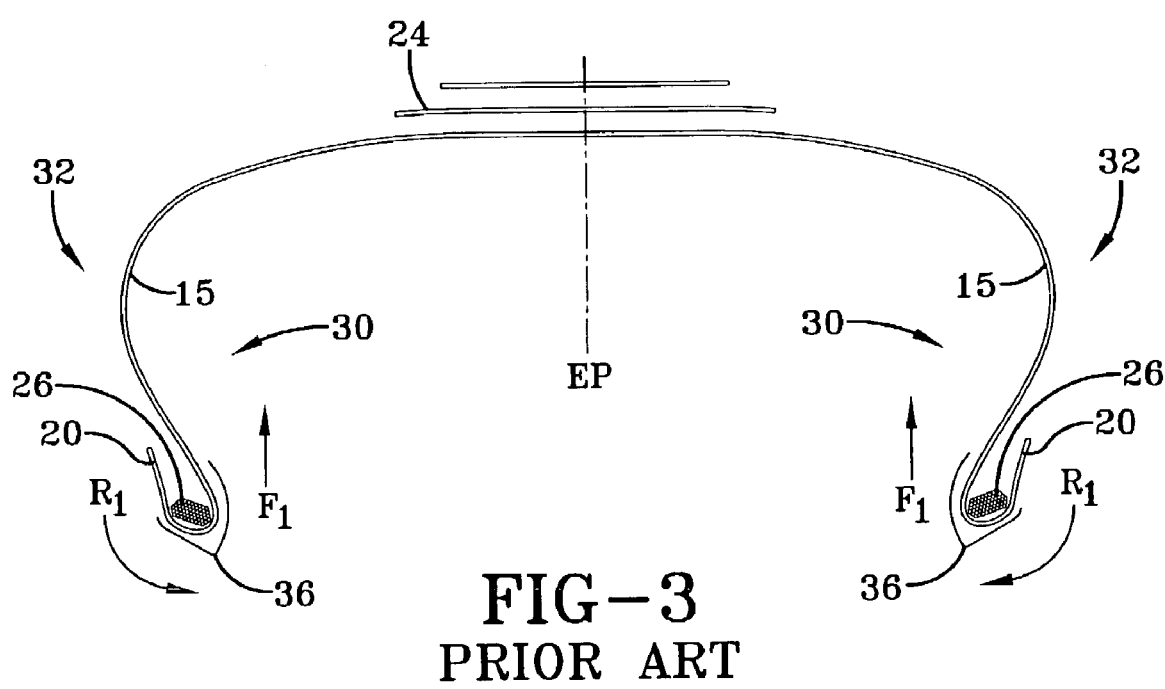
FIG. 3 is a schematic diagram of the prior art tire of FIG. 1.

A schematic diagram of a prior art tire is illustrated in FIG. 3. The tire may have one or more reinforcing belts 24. As can be seen, the turn-up ends 20 wrap around the bead cores 26 in an inside-out fashion with reference to the interior 30 and exterior 32. Under the pressure of inflation, the radial ply 15 exerts an inherent upward force $F_1$ as seen in FIG. 3. The force $F_1$ exerted by the radial ply 15 causes the bead cores 26 to rotate in a direction $R_1$, causing the toe 36 to lift away from the rim (not shown). Over time this lifting creates a permanent set in the bead area making it difficult if not impossible to remount the tire if it is ever removed from the rim. Additionally under the pressure of inflation and the forces experienced during use, the ply in a conventional tire tends to move toward the rim and rubber adjacent the rim is displaced. This results in a noticeable rim indentation.

FIG. 4 shows a cross-sectional view of the general construction of a tire 10 according to one embodiment of the present invention. The tire has a tread portion 12 and a pair of sidewalls 16 wherein the sidewalls are connected to the tread portion by shoulder regions 14. The tire may have one or more reinforcing belts 24. A carcass 18 of the tire includes one or more cord-reinforced radial plies 17, such as steel or aramid cord-reinforced radial plies, extending from side to side. The radial plies 17 are termed "down plies" due to their outside-in orientation, i.e., the plies run down the sidewalls of the tire to a point outside the bead core. The radial down ply 17 includes lateral edge portions 17a, 17b and a central portion 17c. Bead regions 19 of the tire have a pair of axially spaced bead cores 26 around which are wrapped ply flippers 38. An apex 22 is sandwiched between the main body of the carcass 18 and the turn-up ends 20a, 20b. Toes 36 and heels 37 provide a solid base to ensure a snug fit of the tire 10 to a wheel rim (not shown).

Figure 5:
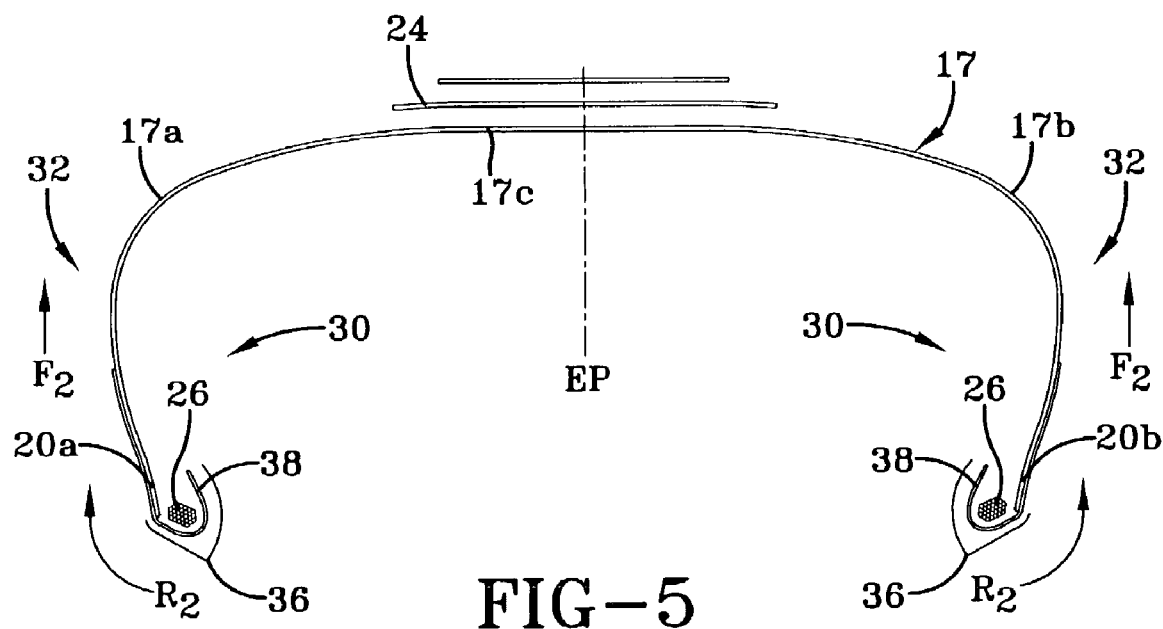
FIG. 5 is a schematic diagram of one embodiment of a tire having a continuous down ply.

A schematic diagram of a more particular embodiment of the tire of FIG. 4 is shown in FIG. 5. The tire may have one or more reinforcing belts 24. Lateral sides 17a, 17b of a radial down ply 17 are oriented generally parallel to the exterior 32 of the tire. Ends 20 of the radial down ply terminate adjacent the bead cores 26. Ply flippers 38 overlap the ends 20, wrap around the beads 26, and terminate generally parallel to the exterior 32 of the tire. The ends 20 and ply flippers 38 exert an upward force $F_2$ which causes the bead cores 26 to rotate in a direction $R_2$, drawing the toe 36 against the rim (not shown) and reducing toe lift. Similarly, the down ply 17 is not drawn into the rim and less rim indentation is usually observed than when the ply runs from inside the bead out.

FIG. 6 shows an expanded cross-sectional view of the bead region 19 of the tire of FIG. 4. A bead 26 that is smaller than conventionally used for the size tire is selected. The cross-sectional shape of the bead cores 26 can vary, e.g., the bead may be triangular, rectangular, hexagonal or other shape. In this embodiment it is defined by a polygonal boundary extending from a flat base. A rectangular boundary may be defined by four lines forming a rectangle 44, wherein one line is tangent to the flat base and the remaining three lines are touching at least a point of the peripheral surface of the bead core, the rectangle having a height less than or equal to the length. The length is inclined at an angle $\alpha$ in the range of about 15 to 25 degrees relative to an axis "S" of rotation. The bead 26 typically may be made smaller by reducing the number of filaments 27 but this effect might also be achieved by reducing the wire gauge of the filaments. The gauge of the filaments usually range from about 0.050 inches to 0.080 inches but any gauge taught for use in truck tires may be used. The number of filaments 27 in a bead core 26 will vary, depending upon the size of the tire. For example, with an outside-in ply a small truck tire (e.g., 15 inch) may utilize as few as 12 filaments, while larger truck tires (e.g., 24.5 inch) may utilize as few as 45 filaments in one embodiment depending on the size of the tire. More particularly, the number of filaments used may vary from about 15 to 40 filaments. Alternatively, a single filament wound into an annulus having a smaller cross sectional area may be used. In any case, the bead size cross-sectional area reduction from that of prior art truck tires may range from about 25% (and in some cases 30% or 40%) reduction for smaller tires and up to about 60% reduction for larger tires. For example, conventional truck tire beads typically have a transverse cross-sectional area of about 0.06–0.27 sq.in. (15 to 65 wires at 0.072 inch diameter). In accordance with certain embodiments of the invention, this cross-sectional area can be reduced to about 0.05 to 0.18 sq.in. (12 to 45 wires at 0.072 inch diameter). Concomitantly, the weight of the tire can be reduced as much as about 5–7% in small tires to as much as about 10% or more in larger tires.

A first ply 40, such as a nylon fabric ply, is wrapped around the bead 26 to prevent the filaments 27 from cutting through the surrounding plies and rubber. The ply flipper 38 wraps around the bead 26 and terminates in a turn-up end 39, oriented generally parallel to the exterior 32 of the tire. A ply flipper 38 is wrapped around each of the ends 20a, 20b and acts to transfer the force from the ply into torque around the bead and further acts to anchor the ply to the bead. Toes 36 and heels 37 provide a solid base to ensure a snug fit of the tire 10 to a wheel rim (not shown). This action increases the burst strength capacity of the tire.

Figure 7:
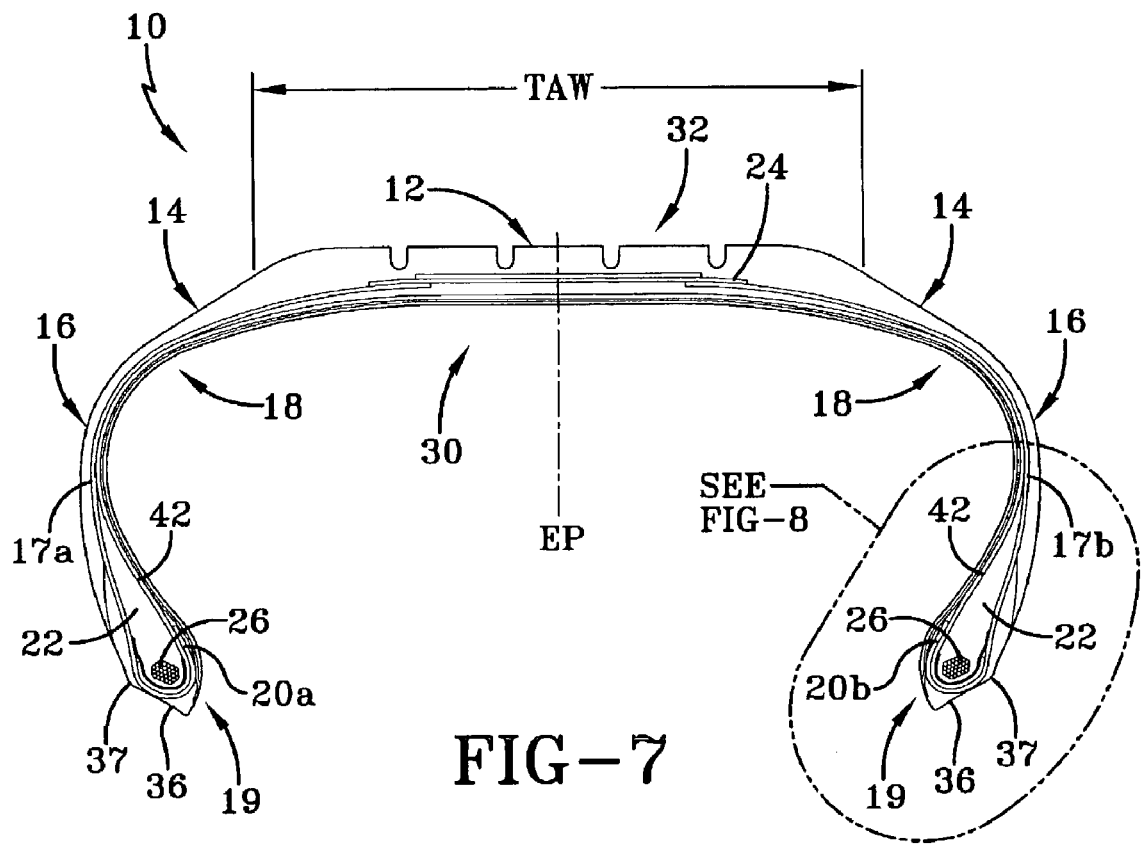
FIG. 7 is a cross-sectional view of the general construction of a tire having a split down ply according to an alternate embodiment of the present invention.

FIG. 7 shows a cross-sectional view of the general construction of a tire 10 according to an alternate embodiment of the present invention in which the cord-reinforced radial ply is split. By splitting the ply, tires including one or more down plies can be built on a conventional tire building machine. The tire has a tread portion 12 and a pair of sidewalls 16 wherein the sidewalls are connected to the tread portion by shoulder regions 14. The tire may have one or more reinforcing belts 24. A carcass 18 of the tire includes one or more radial down plies 17. The radial down plies 17 consist of two separate "split" plies 17a and 17b. Bead regions 19 of the tire have a pair of axially spaced bead cores 26 around which are wrapped turn-up ends 20a, 20b of the radial down plies 17a, 17b. An apex 22 is sandwiched between the main body of the carcass 18 and the turn-up ends 20a, 20b. Toes 36 and heels 37 provide a solid base to ensure a snug fit of the tire 10 to a wheel rim (not shown). FIG. 7 also illustrates the equatorial plane ("EP") and the tread arc width ("TAW") of the tire 10.

Figure 8:
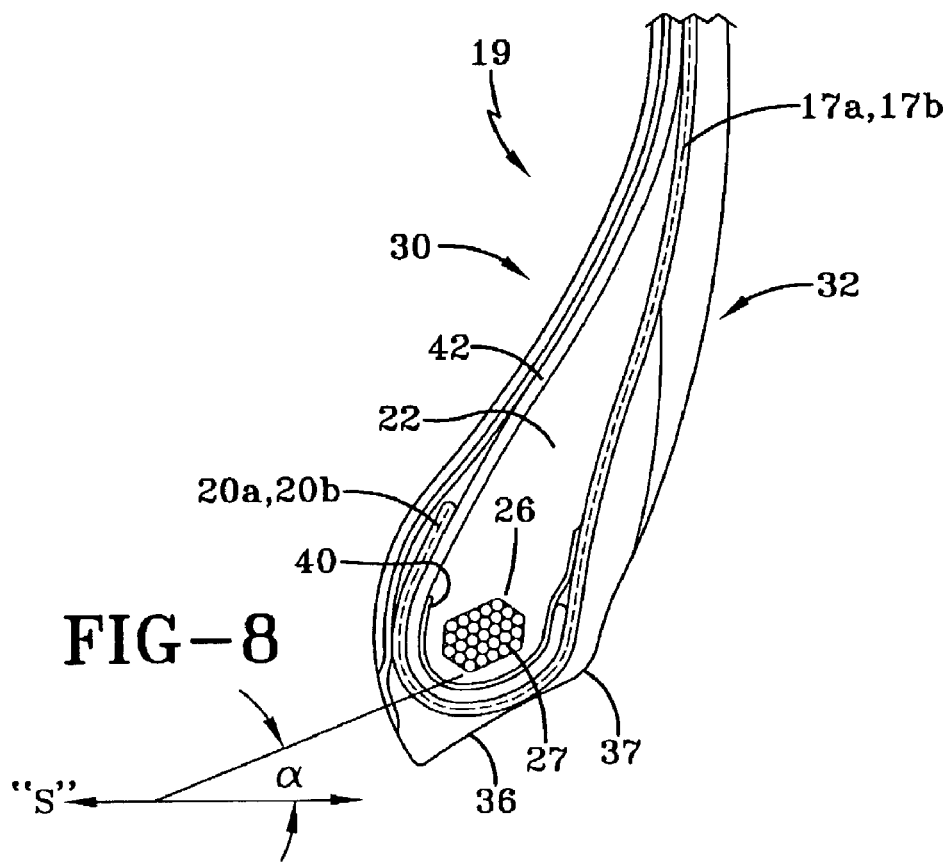
FIG. 8 shows an expanded cross-sectional view of the bead region of the tire of FIG. 7.

FIG. 8 shows an expanded cross-sectional view of the bead region 19 of the tire of FIG. 7. A bead 26 that is smaller than prior art bead cores is selected. As previously disclosed, the cross-sectional shape of the bead cores 26 is confined within a polygonal boundary extending from a flat base. The length is inclined at an angle α in the range of about 15 to 25 degrees relative to an axis "S" of rotation. A first ply 40, such as a nylon fabric ply, is wrapped around the bead 26 to prevent the filaments 27 from cutting through the surrounding plies and rubber. The radial down ply 17b is routed generally parallel to the exterior 32 of the tire. The radial down ply 17 wraps around the bead 26 and terminates in a turn-up end 20, oriented generally parallel to the interior 30 of the tire. A second ply 42, such as a nylon ply, may optionally be used.

One measure of the tire's air cavity integrity is "burst strength" which is measured by pumping water into the tire until the weakest link in the reinforcing structure breaks. A burst strength of at least 26 bar and more typically at least 29 bar is desired in a truck tire. The following table provides an example of the bead core reduction that is feasible in accordance with certain embodiments of the invention. For tires having the tire size and number of wires shown in the following table, satisfactory burst strength can be achieved using an outside-in ply with bead cores having the number of wires or the cross-sectional area shown in Table 1:

TABLE 1

| Tire Size Invention | Conventional Winds (No.) | Conventional Bead Area (sq. in.) | Reduced Winds (No.) | Reduced Approx. Bead Area (sq. in.) |
|---|---|---|---|---|
| 315/80R22.5 | 57 | 0.23 | 29–33 | 0.12–0.13 |
| 295/75R22.5 | 36 | 0.15 | 19–24 | 0.08–0.10 |
| 11R22.5 | 36 | 0.15 | 19–24 | 0.08–0.10 |
| 11R22.5 | 51 | 0.21 | 27–29 | 0.11–0.12 |
| 255/70R22.5 | 34 | 0.14 | 18–24 | 0.07–0.10 |
| 285/75R24.5 | 36 | 0.15 | 18–24 | 0.07–0.10 |
| 11R24.5 | 36 | 0.15 | 18–24 | 0.07–0.10 |
| 11R24.5 | 51 | 0.21 | 27–29 | 0.11–.012 |
| 225/70R19.5 | 20 | 0.08 | 12–16 | 0.05–0.07 |
| 225/70R19.5 | 24 | 0.10 | 13–16 | 0.05–0.07 |
| 245/70R19.5 | 24 | 0.10 | 13–16 | 0.05–0.07 |

Figure 9:
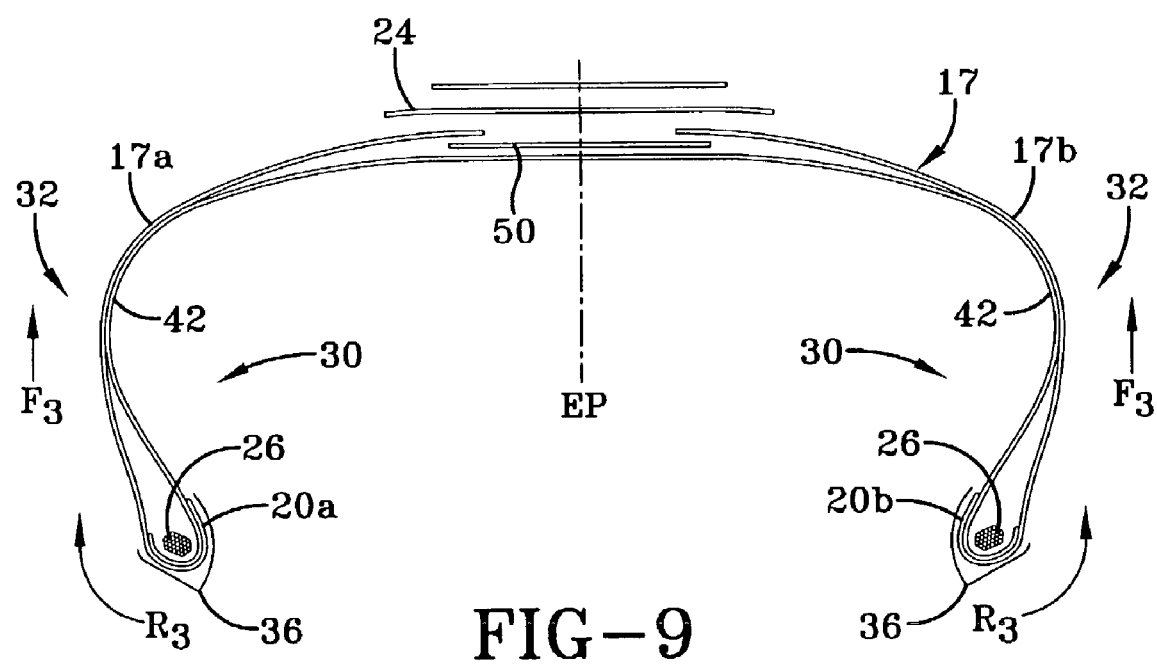
FIG. 9 is schematic diagram of another embodiment of a tire in accordance with the invention having a split down ply with a flat ply.

A schematic diagram of another embodiment of a tire in accordance with the invention is illustrated in FIG. 9. The tire may have one or more belts 24. The turn-up ends 20a, 20b of the radial outside-in down plies 17a, 17b wrap around the bead cores 26 in an outside-in fashion with reference to the exterior 32 and the interior 30. In this embodiment the tire includes an additional flat ply 50 that is located below the belts 24 and spans the gap between the split plies 17a and 17b. Locating the turn-up ends 20a, 20b in this manner results in an inherent upward force $F_3$ on the bead cores 26.

The bead cores 26 rotate in a direction $R_3$ (opposite of $R_1$ present in the prior art) in response to the force $F_3$, causing the toe 36 to press against the rim (not shown). This action increases the burst strength capacity of the tire in comparison to the prior art. A second ply 42, such as a nylon ply, may optionally be used to act as a bladder to facilitate building of a split ply tire on a conventional building machine.

The invention is further illustrated with reference to the following example:

EXAMPLE

The reduction in bead size and tire weight of a tire produced according to an embodiment of the present invention, designated C1, is compared to a prior art tire, designated "Control." The metrics are illustrated in Table 2.

TABLE 2

|  | Units | Control | C1 |
|---|---|---|---|
| Number of Bead Wires | Filament Gauge (0.072 inch) | 57 | 29 |
| Weight | Kilograms | 68.5 | 60.6 |

While the present invention has been described with respect to certain specific examples, it will be apparent that many modifications and variations are possible without departing from the scope of the following claims.

What is claimed is:

1. A pneumatic radial ply truck tire comprising:
a pair of axially-spaced bead cores, each bead core having a toe extending therefrom;
a carcass formed of a single cord-reinforced radial ply with a central portion and lateral edge portions, each of said lateral edge portions not being wrapped around an associated one of said bead cores and having an end that is located axially outside and adjacent to an associated one of said bead cores; and
a pair of ply flippers, wherein each ply flipper is wrapped around an associated bead core such that a first end of said ply flipper is positioned axially outside said bead core and a second end of said ply flipper is position axially inside said bead core, wherein said lateral edge portion of said radial ply is positioned axially inside of said first end of said ply flipper,
wherein said toes extending from said bead cores are pulled downward, thereby reducing toe lifting.

2. The truck tire of claim 1 wherein said bead cores have a radially inner flat base and a cross-sectional shape of said bead cores is confined within a rectangular boundary extending from said flat base, said rectangular boundary being defined by four lines forming a rectangle, one line tangent to said flat base and the remaining three lines touching at least a point of a peripheral surface of said bead core, said rectangle having a height less than or equal to a length, said length being inclined at an angle a in the range of about 15 to about 25 degrees relative to an axis "S" of rotation.

3. The truck tire of claim 1 further comprising a pair of fabric plies, each fabric ply being wrapped around an associated one of said bead cores.

4. The truck tire of claim 1 wherein said cord-reinforced radial ply is a steel cord-reinforced radial ply.

5. The truck tire of claim 1 wherein each of said bead cores includes between about 12 and about 45 wires, said wires having a diameter of about 0.050 inches to about 0.080 inches.

6. The truck tire of claim 1 wherein said tire is a 315/80 R22.5 tire having about 29 to about 33 wire filaments in said bead core or a bead cross-sectional area of about 0.12 to about 0.13 square inches.

7. The truck tire of claim 6 wherein the tire has a TRA rated maximum load limit of about 2,680 to about 12,300 pounds at an inflation pressure of about 80 to about 130 psi.

8. The truck tire of claim 1 wherein said cord-reinforced radial ply, in conjunction with said ply flippers, pulls said toes downward and reduces toe lifting.

9. The truck tire of claim 1 wherein said tire is designed to be inflated to about 80 to about 130 psi.

10. The truck tire of claim 1 wherein said bead cores have a diameter of about 15 to about 25 inches.

11. The truck tire of claim 1 wherein each of said bead cores has a cross-sectional area of about 0.05 to about 0.18 square inches.

12. (Withdrawn) The truck tire of claim 1 wherein the tire is a 295/75R22.5 tire having about 19–24 wires filaments in the bead or a bead cross-sectional area of about 0.08 to 0.10 sq. in.

13. The truck tire of claim 1 wherein the tire is a 11R22.5 tire having about 19–24 wires filaments in the bead or a bead cross-sectional area of about 0.08 to 0.10 sq. in.

14. The truck tire of claim 1 wherein the tire is a 11R22.5 tire having about 27–29 wires filaments in the bead or a bead cross-sectional area of about 0.11 to 0.12 sq. in.

15. The truck tire of claim 1 wherein the tire is a 255/70R22.5 tire having about 18–24 wires filaments in the bead or a bead cross-sectional area of about 0.07 to 0.10 sq. in.

16. The truck tire of claim 1 wherein the tire is a 285/7R24.5 tire having about 18–24 wires filaments in the bead or a bead cross-sectional area of about 0.07 to 0.10 sq. in.

17. The truck tire of claim 1 wherein the tire is a 11R24.5 tire having about 18–24 wires filaments in the bead or a bead cross-sectional area of about 0.07 to 0.10 sq. in.

18. The truck tire of claim 1 wherein the tire is a 11R24.5 tire having about 27–29 wires filaments in the bead or a bead cross-sectional area of about 0.11 to 0.12 sq. in.

19. The truck tire of claim 1 wherein the tire is a 225/70R19.5 tire having about 12–16 wires filaments in the bead or a bead cross-sectional area of about 0.05 to 0.07 sq. in.

20. The truck tire of claim 1 wherein the tire is a 225/70R19.5 tire having about 13–16 wires filaments in the bead or a bead cross-sectional area of about 0.05 to 0.07 sq. in.

21. The truck tire of claim 1 wherein the tire is a 245/70R19.5 tire having about 13–16 wires filaments in the bead or a bead cross-sectional area of about 0.05 to 0.07 sq. in.

22. A 315/80R22.5 tire comprising:
a pair of axially-spaced bead cores, each bead core having a toe extending therefrom, wherein each of said bead cores includes about 29 to about 33 wire filaments or has a cross-sectional area of about 0.12 to about 0.13 square inches; and
a carcass having at least one cord-reinforced radial ply with a central portion and lateral edge portions, each lateral edge portion having an end that folds from a position axially outside the bead cores to a position axially inside and around the bead cores,
wherein said toes extending from said bead cores are pulled downward, thereby reducing toe lifting.

23. The 315/80R22.5 tire of claim 22 wherein said tire has a TRA rated maximum load limit of about 2,680 to about 12,300 pounds at an inflation pressure of about 80 to about 130 pounds per square inch.

24. The 315/80R22.5 tire of claim 23 wherein said tire is designed to be inflated to a pressure of about 80 to about 130 pounds per square inch.

* * * * *